(12) United States Patent
Yin et al.

(10) Patent No.: US 10,529,475 B2
(45) Date of Patent: Jan. 7, 2020

(54) INDUCTOR STRUCTURE INCLUDING INDUCTORS WITH NEGLIGIBLE MAGNETIC COUPLING THEREBETWEEN

(75) Inventors: Jian Yin, San Jose, CA (US); Michael Althar, Melbourne, FL (US); Steve Rivet, Malabar, FL (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 279 days.

(21) Appl. No.: 13/538,467

(22) Filed: Jun. 29, 2012

(65) Prior Publication Data

US 2013/0106500 A1    May 2, 2013

Related U.S. Application Data

(60) Provisional application No. 61/553,176, filed on Oct. 29, 2011.

(51) Int. Cl.

| H01F 27/24 | (2006.01) |
| H01L 27/08 | (2006.01) |
| H01F 3/08 | (2006.01) |
| H01F 3/10 | (2006.01) |
| H01F 17/04 | (2006.01) |

(Continued)

(52) U.S. Cl.
CPC ............. *H01F 3/08* (2013.01); *H01F 3/10* (2013.01); *H01F 17/04* (2013.01); *H01F 27/255* (2013.01); *H02M 3/1584* (2013.01); *H01F 2003/106* (2013.01)

(58) Field of Classification Search
CPC .......... H01F 17/06; H01F 27/24; H01F 30/06; H01L 2924/15173; H01L 2724/97; H05K 2201/086; H05K 2201/09663

USPC .............. 336/196, 199, 200, 205, 208, 212; 29/602.1; 257/531

See application file for complete search history.

(56) References Cited

U.S. PATENT DOCUMENTS 2,302,893 A * 11/1942 Roberts .................. H01F 21/08
307/91
2,578,395 A * 12/1951 Brooks .................. H01F 38/10
307/149

(Continued)

FOREIGN PATENT DOCUMENTS

JP    2010114302 A *  5/2010

*Primary Examiner* — Elvin G Enad
*Assistant Examiner* — Joselito Baisa
(74) *Attorney, Agent, or Firm* — Foley & Lardner LLP (57) ABSTRACT

An embodiment of an apparatus includes first and second core regions, first and second conductors, and an isolation region. The first core region has a first permeability, and the first conductor is disposed in the first core region. The second core region has a second permeability, and the second conductor is disposed in the second core region. And the isolation region is disposed between the first and second core regions, and has a third permeability that is significantly different than the first and second permeabilities. For example, the first and second conductors may be windings of respective first and second inductors, and the isolation region, which may be attached to, or integral with, the first and second core regions, may reduce the amount of magnetic coupling between the inductors to a level that is negligible, such that the inductors may be used in applications that call for magnetically uncoupled inductors.

21 Claims, 5 Drawing Sheets

(51) Int. Cl.
*H01F 27/255* (2006.01)
*H02M 3/158* (2006.01)

(56) References Cited

U.S. PATENT DOCUMENTS

| | | | | |
|---|---|---|---|---|
| 2,844,786 A * | 7/1958 | Cluwen | ............... | G01S 7/282 |
| | | | | 323/362 |
| 3,247,450 A * | 4/1966 | Medlar | ............... | 323/307 |
| 3,403,298 A | 9/1968 | Richards et al. | ............... | 336/65 |
| 3,659,191 A * | 4/1972 | Spreadbury | ............... | 323/248 |
| 4,122,385 A * | 10/1978 | Oberbeck | ............... | H02H 9/021 |
| | | | | 323/362 |
| 4,152,637 A * | 5/1979 | Oberbeck | ............... | H02H 9/021 |
| | | | | 323/250 |
| 4,177,418 A * | 12/1979 | Brueckner | ............... | H01F 29/14 |
| | | | | 174/DIG. 17 |
| 4,455,545 A * | 6/1984 | Shelly | ............... | H01F 5/003 |
| | | | | 336/178 |
| 4,599,595 A * | 7/1986 | Geschka | ............... | H01F 3/14 |
| | | | | 336/178 |
| 5,574,420 A * | 11/1996 | Roy | ............... | H01F 17/0033 |
| | | | | 336/200 |
| 5,783,984 A * | 7/1998 | Keuneke | ............... | H03H 7/38 |
| | | | | 336/155 |
| 6,014,071 A * | 1/2000 | Onishi et al. | ............... | 336/170 |
| 6,060,977 A * | 5/2000 | Yamamoto | ............... | H01F 17/04 |
| | | | | 336/212 |
| 6,198,374 B1 * | 3/2001 | Abel | ............... | 336/200 |
| 6,301,133 B1 * | 10/2001 | Cuadra | ............... | H02J 1/102 |
| | | | | 363/65 |
| 6,433,299 B1 * | 8/2002 | Varshney | ............... | 219/121.47 |
| 6,548,967 B1 * | 4/2003 | Dowling | ............... | G06Q 30/0201 |
| | | | | 315/318 |
| 6,737,946 B2 * | 5/2004 | Seale | ............... | F16K 31/0675 |
| | | | | 251/129.15 |
| 6,753,752 B1 * | 6/2004 | Lin | ............... | H01F 3/14 |
| | | | | 336/178 |
| 6,885,274 B2 * | 4/2005 | Hsu | ............... | H01F 17/04 |
| | | | | 336/182 |
| 7,142,081 B1 * | 11/2006 | Shudarek | ............... | H01F 27/24 |
| | | | | 336/178 |
| 7,192,128 B1 * | 3/2007 | Hattori | ............... | B41J 2/17513 |
| | | | | 347/7 |
| 7,280,025 B2 * | 10/2007 | Sano | ............... | H01F 17/06 |
| | | | | 336/200 |
| 7,427,909 B2 * | 9/2008 | Ono et al. | ............... | 336/90 |
| 7,498,920 B2 * | 3/2009 | Sullivan | ............... | H01F 17/06 |
| | | | | 336/200 |
| 7,750,413 B2 * | 7/2010 | Hayashi | ............... | H01L 21/8221 |
| | | | | 257/374 |
| 7,915,991 B2 * | 3/2011 | Waffenschmidt et al. | ... | 336/200 |
| 8,125,401 B2 * | 2/2012 | Ito et al. | ............... | 343/788 |
| 8,395,472 B2 * | 3/2013 | Roozeboom et al. | ........ | 336/200 |
| 8,810,335 B2 * | 8/2014 | Ichihara | ............... | H01F 27/38 |
| | | | | 333/177 |
| 9,640,604 B2 * | 5/2017 | Chen | ............... | H01L 28/10 |
| 2005/0001707 A1 * | 1/2005 | Elliott | ............... | H01F 17/06 |
| | | | | 336/200 |
| 2006/0157798 A1 * | 7/2006 | Hayashi | ............... | H01L 21/8221 |
| | | | | 257/374 |
| 2006/0250207 A1 * | 11/2006 | Shudarek | ............... | H01F 27/24 |
| | | | | 336/212 |
| 2008/0012674 A1 * | 1/2008 | Sano | ............... | H01F 17/06 |
| | | | | 336/83 |
| 2009/0091414 A1 * | 4/2009 | Hopper | ............... | H01F 17/0013 |
| | | | | 336/212 |
| 2013/0033351 A1 * | 2/2013 | Kim | ............... | H01F 27/38 |
| | | | | 336/170 |

* cited by examiner

INDUCTOR STRUCTURE INCLUDING INDUCTORS WITH NEGLIGIBLE MAGNETIC COUPLING THEREBETWEEN

CLAIM OF PRIORITY

The present application claims the benefit of U.S. Provisional Patent Application Ser. No. 61/553,176 filed on Oct. 29, 2011; which application is incorporated herein by reference in its entirety.

SUMMARY

An embodiment of an apparatus includes first and second core regions, first and second conductors, and an isolation region. The first core region has a first permeability, and the first conductor is disposed in the first core region. The second core region has a second permeability, and the second conductor is disposed in the second core region. And the isolation region is disposed between the first and second core regions, and has a third permeability that is significantly different than the first and second permeabilities.

For example, the first and second conductors may be windings of respective first and second inductors, and the isolation region, which may be attached to, or integral with, the first and second core regions, may reduce the amount of magnetic coupling between the inductors to a level that is negligible, such that the inductors may be used in applications that call for magnetically uncoupled inductors. Allowing such magnetically uncoupled inductors to be disposed in a common inductor structure may reduce the space occupied by the inductors as compared to inductors that are disposed in separate structures. Furthermore, such an inductor structure may improve on, or eliminate, other deficiencies of conventional inductor structures.

DETAILED DESCRIPTION

One or more embodiments are described with reference to the drawings, wherein like reference numerals may be used to refer to like elements throughout. In the following description, for purposes of explanation, numerous specific details are set forth in order to provide a thorough understanding of the one or more embodiments. It may be evident, however, that one or more embodiments may be practiced without these specific details. In other instances, well-known structures and devices are shown in block diagram form in order to facilitate describing one or more embodiments.

Sometimes it is desirable to dispose inductors in a same package with a common-core structure, even for applications that call for magnetically uncoupled inductors. Reasons for this may include a reduced package size and reduced manufacturing costs per inductor, and a per-inductor reduction in the area that the packaged inductors occupy on a printed-circuit board.

Figure 1:
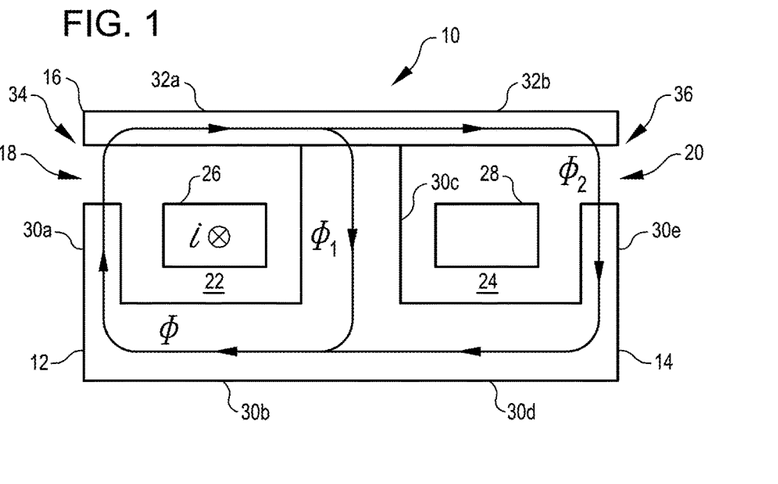
FIG. 1 is a cutaway side view of an embodiment of an inductor structure that includes inductors that are suitable for applications that call for magnetically uncoupled inductors.

FIG. 1 is a cutaway side view of an inductor structure 10 according to an embodiment.

The inductor structure 10 includes a common core 12 having an E-core section 14, an I-core section 16, air gaps 18 and 20, and winding openings 22 and 24. The E-core and I-core sections 14 and 16 may be formed from any conventional magnetic material such as a ferrite material.

The inductor structure 10 also includes single-turn windings 26 and 28, which extend through the winding openings 22 and 24, respectively. The windings 26 and 28 may be formed from any type of conductor such as copper, and may be, for example, from wire that is insulated, un-insulated, single-strand, or multi-strand.

The E-core section 14 includes core segments $30_a$-$30_e$, and the I-core section 16 includes core segments $32_a$-$32_b$.

The combination of the winding 26, the air gap 18, and the core segments $30_a$, $30_b$, $30_c$, and $32_a$ forms a first inductor 34, and the combination of the winding 28, the air gap 20, and the core segments $30_c$, $30_d$, $30_e$, and $32_b$ forms a second inductor 36.

Each core segment has a respective magnetic reluctance $R_{core\_segment}$, which is given by the following equation:

$$R_{core\_segement} = \frac{l_{core\_segment}}{\mu_{core\_segment} A_{core\_segment}} \quad (1)$$

where $I_{core\_segment}$ is the length of the core segment, $A_{core\_segment}$ is the cross-sectional area of the core segment (for example purposes it is assumed that each core segment has a uniform cross-sectional area throughout its length), and $\mu_{core\_segment}$ is the permeability of the material that forms the core segment (for example purposes, it is assumed that the permeabilities of the core segments are equal, and that the permeability of each core segment is uniform throughout the length and width of the core segment).

Similarly, each air gap 18 and 20 has a respective magnetic reluctance $R_{gap}$, which is given by the following equation:

$$R_{gap} = \frac{l_{gap}}{\mu_{gap} A_{gap}} \quad (2)$$

where $I_{gap}$ is the length of the air gap (for example purposes it is assumed that each air gap has the same length), $A_{gap}$ is the cross-sectional area of the air gap (for example purposes it is assumed that each air gap has the same uniform cross-sectional area throughout its length), and $\mu_{gap}$ is the permeability of air, which is close to the permeability of free space, and, therefore, which is typically much less than $\mu_{core\_segment}$. For example, as discussed below, to reduce the magnetic coupling between the inductors 34 and 36 to a negligible level where one may consider the inductors to be magnetically uncoupled, a ratio $$\frac{\mu_{core\_segment}}{\mu_{gap}} \geq 1500$$

may be used.

In general, to uncouple the inductors 34 and 36 from one another magnetically, one designs the inductor structure 10 such that negligible magnetic flux generated by a current through the winding 26 flows in a closed loop around the winding 28, and such that negligible magnetic flux generated by a current through the winding 28 flows in a closed loop around the winding 26. For purposes of analysis, details of which are provided below, FIG. 1 shows a flux $\phi$ generated by a current i flowing through the winding 26 in a direction into the page. A first portion $\phi_1$ of the flux $\phi$ flows through the core segment $30_c$, and a second portion $\phi_2$ of the flux $\phi$ flows through the core segment $32_b$, air gap 20, and core segments $30_e$ and $30_d$; as described below, the inductors 34 and 36 are magnetically uncoupled with respect to the current i when $\phi_2$=0, or is otherwise negligible compared to $\phi$. A similar analysis applies to a flux generated by a current through the winding 28.

Figure 2:
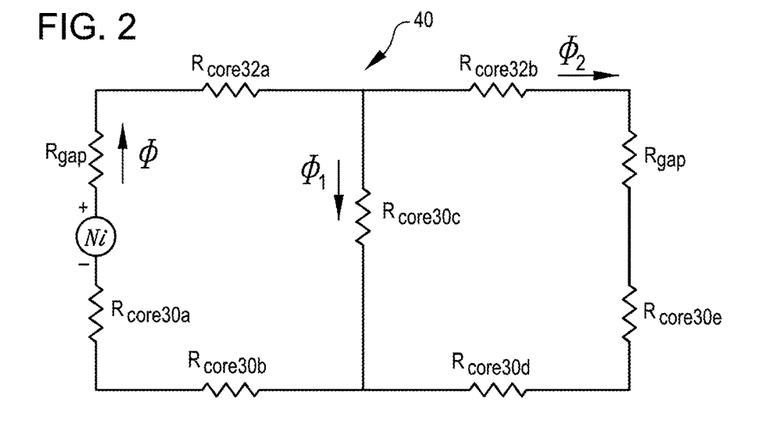
FIG. 2 is an embodiment of a magnetic-circuit model of the inductor structure of FIG. 1.

FIG. 2 is a schematic diagram of a magnetic-circuit model 40 of the inductor structure 10 of FIG. 1 according to an embodiment where a current i is driven into the page of the winding 26, and no current is being driven through the winding 28. Because $$\frac{\mu_{core\_segment}}{\mu_{gap}} \geq 1500,$$

$R_{gap} \gg R_{core\_30a} \to R_{core\_30e}$, and $R_{gap} \gg R_{core\_32a} \to R_{core\_32b}$; consequently, one may perform a first-order analysis by assuming that $R_{core30a} \approx R_{core30b} \approx R_{core\_30d} \approx R_{core\_30e} \approx R_{core\_32a} \approx R_{core\_32b} = 0$ to obtain a simplified version of the magnetic-circuit model 40 as described below in conjunction with FIG. 3.

Figure 3:
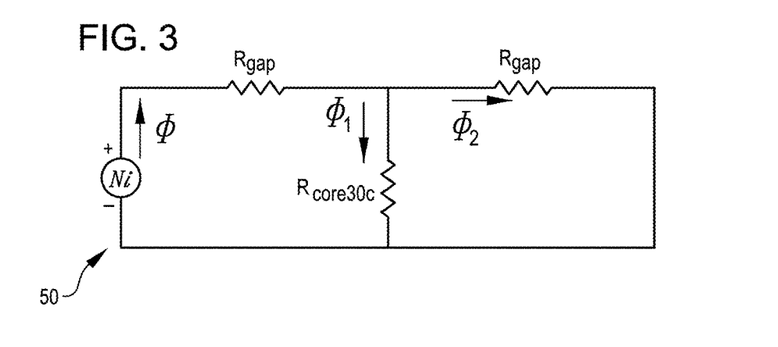
FIG. 3 is an embodiment of a simplified magnetic-circuit model of the structure of FIG. 1.

FIG. 3 is a schematic diagram of a magnetic-circuit model 50 of the inductor structure 10 of FIG. 1, where the circuit model 50 is a simplified version of the magnetic-circuit model 40 of FIG. 2. The circuit model 50 is generated by making the assumptions regarding the gap and core reluctances $R_{gap}$ and $R_{core\_segment}$ as described above in conjunction with FIG. 2.

Referring to FIG. 3, $\phi_2$ is given by the following equation:

$$\Phi_2 = \Phi \frac{R_{core\_30c}}{R_{core\_30c} + R_{gap}} \tag{3}$$

As discussed above in conjunction with FIG. 1, there is no coupling between the inductors 34 and 36 when $\phi_2$=0, or otherwise when $\phi_2 \ll \phi$. Therefore, the larger the ratio $$\frac{R_{gap}}{R_{core\_30c}},$$

the smaller $\phi_2$, and the smaller the magnetic coupling between the inductors 34 and 36. For example, if $$\frac{R_{gap}}{R_{core\_30c}} = 100,$$

then:

$$\Phi_2 = \Phi \frac{R_{core30c}}{R_{core30c} + 1500 R_{core30c}} = \Phi \frac{1}{101} = 0.0099\Phi = 0.99\% \tag{4}$$

of the total flux $\phi$.

Consequently, at least in theory, if $R_{gap} \gg R_{core\_30a} \to R_{core\_32b}$, then the inductor structure 10 includes two inductors 34 and 36, which, for many applications, may be considered to be magnetically uncoupled from one another.

But referring to FIGS. 1-3, there may be some problems with the inductor structure 10.

For example, the inductor structure 10 may require relatively expensive manufacturing techniques to meet relatively precise manufacturing tolerances. As an example, a relatively precise manufacturing tolerance may be required for there to be no, or negligible, air gap between the I-core 16 and the segment $30_c$ of the E-core 14; if there is an air gap in this location, then the effective value of $R_{core\_30c}$, and thus the coupling flux $\phi_2$, will become much greater. Furthermore, the lengths l of the air gaps 18 and 20 typically need to be tightly controlled so that the inductors 34 and 36 have their rated inductances. For example, if the inductors 34 and 36 are rated has having equal inductances, then the air gaps 18 and 20 typically must have the same lengths within a relatively precise tolerance. Unfortunately, such relatively precise tolerance requirements can raise the costs of manufacturing the inductor structure 10 significantly.

Furthermore, the high-permeability material from which the E-core 14 and the I-core 16 are typically formed may allow electrical cross talk between the inductors 34 and 36. Typically, the high-permeability material from which the E-core 14 and the I-core 16 are formed has a relatively low electrical resistance; therefore, if the windings 26 and 28 contact the core 12 in any location—the windings may be un-insulated to save space and cost—then this contact may form a low-resistance electrical path between the windings. Such a low-resistance path may allow undesired electrical coupling or cross talk between the windings 26 and 28, and thus between the inductors 34 and 36.

In addition, each of the windings 26 and 28 typically can have only a single turn; the ability to have only a single turn may limit the range of inductance values that the inductors 34 and 36 may have.

Moreover the inductor structure 10 may make an audible noise while it is operating. Because each winding 26 and 28 may be suspended within the respective openings 22 and 24 to prevent contact with the core 12, each winding may vibrate within a respective opening while the winding is being driven with a current having a frequency that excites one or more resonant modes of the winding. If one or more of these modes has a frequency that is in the range of human hearing, then this vibration may cause an undesirable audible noise (e.g., transformer "hum").

Furthermore, the inductors 34 and 36 may have poor magnetic-saturation characteristics. Typically, the ferrite material from which the core 12 is formed has a relatively low magnetic-saturation point. Consequently, each of the inductors 34 and 36 may have a relatively low magnetic-saturation current, and may also have an inductance that falls off steeply as the winding current exceeds the magnetic-saturation current.

Figure 4:
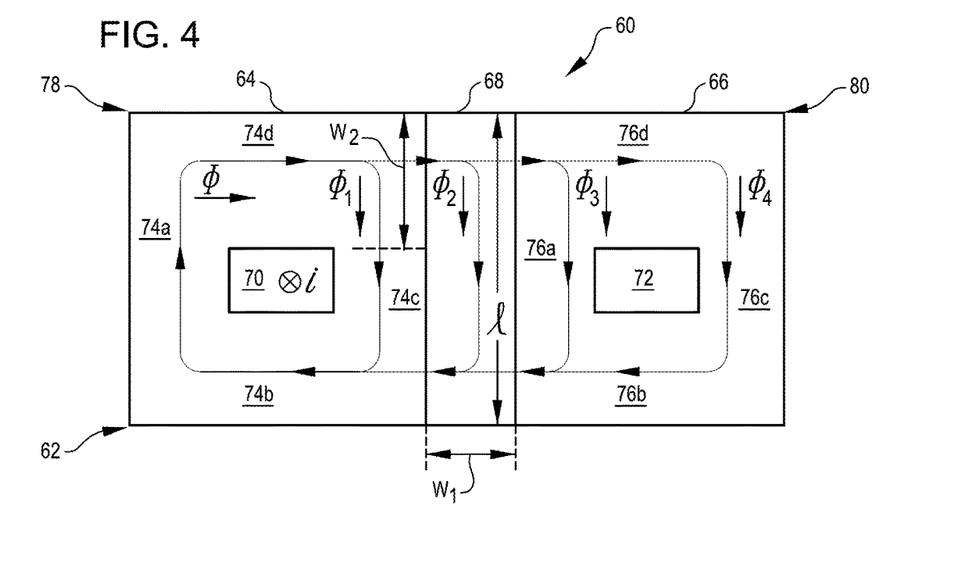
FIG. 4 is a cutaway side view of another embodiment of an inductor structure.

FIG. 4 is a cutaway side view of an inductor structure 60 according to an embodiment. The inductor structure 60 may improve upon one or more of the potential shortcomings described above for the inductor structure 10 of FIG. 1

The inductor structure 60 includes a core 62 having a first core section 64, a second core section 66, and an isolator section 68 disposed between the first and second core sections. The core sections 64 and 66 may be formed under relatively high temperature and pressure from a powder-alloy material having a relatively low permeability (e.g., $\mu_r \leq 100$ where $\mu_r$ indicates the relative permeability of the material)) and a relatively low-conductivity (e.g., $\rho \geq 10^4$ $\Omega/m$). The powder-alloy material includes a binder, such as epoxy, and a magnetic-alloy powder, such as cobalt powder, that is uniformly distributed throughout the binder. And the isolator section 68 may be formed from a relatively high-permeability (e.g., $100 \leq \mu_r \leq 15,000$) material, such as material P51 manufactured by ACME. The core 62 may be formed by pressing the core sections 64 and 66 against opposite sides of the isolator section 68 under high temperature and pressure, either during the same step as the formation of the core sections, or in a separate step after the formation of the core sections. Therefore, one may consider the core sections 64 and 66 to be attached to the isolation section 68 to form the core 62, or one may consider that the core 62 is an integral unit formed from the core sections and the isolation section, which is integral to the core sections.

The inductor structure 60 also includes single-turn windings 70 and 72, which extend approximately through the centers of the first and second core sections 64 and 66, respectively. The windings 70 and 72 may be formed from any type of conductor such as copper, and may be, for example, insulated or un-insulated single-strand or multi-strand wire. And the windings may be installed in the core sections 64 and 66 before, during, or after the formation of the core sections.

The core section 64 includes core segments $74_a$-$74_d$, and the core section 66 includes core segments $76_a$-$76_d$.

The combination of the core section 64 and the winding 70 forms a first inductor 78, and the combination of the core section 66 and the winding 72 forms a second inductor 80.

Each core segment 74 and 76 has a respective magnetic reluctance $R_{core\_segment}$, which is given by the following equation:

$$R_{core\_segment} = \frac{l_{core\_segment}}{\mu_{core\_segment} A_{core\_segment}} \quad (5)$$

where $l_{core\_segment}$ is the length of the core segment (for example purposes it is assumed that all core segments 74 and 76 have the same length), $A_{core\_segment}$ is the cross-sectional area of the core segment (for example purposes it is assumed that all core segments have the same uniform cross-sectional area throughout their lengths), and $\mu_{core\_segment}$ is the permeability of the material that forms the core segment (for example purposes, it is assumed that the permeabilities of all the core segments are equal, and that the permeabilities of all core segments are uniform throughout the lengths and widths of the core segments).

The isolator section 68 has two relevant reluctances: $R_{isolator\_width}$ in the width $w_1$ dimension of the isolator section, and $R_{isolator\_length}$ in the length l dimension of the isolator section. $R_{isolator\_width}$ and $R_{isolator\_length}$ are given by the following equations:

$$R_{isolator\_width} = \frac{w_{isolator}}{\mu_{isolator} A_{isolator\_width}} \quad (6)$$

where $w_{isolator}$ is, in a first-order approximation, the width $w_1$ in FIG. 4, $\mu_{isolator}$ is the permeability of the isolation section 68, and $A_{isolator\_width}$, in a first-order approximation, includes $w_2$ of FIG. 4 as one of its dimensions (the other dimension is the depth of the isolation section into the page of FIG. 4), and $$R_{isolator\_lenght} = \frac{l_{isolator}}{\mu_{isolator} A_{isolater\_length}} \quad (7)$$

where $l_{isolator}$ is the length l in FIG. 4, $\mu_{isolator}$ is the permeability of the isolation section 68, and $A_{isolator\_length}$, in a first-order approximation, includes $w_1$ of FIG. 4 as one of its dimensions (the other dimension is the depth of the isolation section into the page of FIG. 4). For example, as discussed below, to reduce the magnetic coupling between the inductors 78 and 80 to a level where one may consider the inductors to be magnetically uncoupled, one may use a ratio $$\frac{\mu_{isolator}}{\mu_{core\_segment}} \geq 100.$$

As discussed above, to uncouple the inductors 78 and 80 from each other magnetically, one designs the inductor structure 60 such that negligible magnetic flux generated by a current through the winding 70 flows in the core section 66, and such that negligible magnetic flux generated by a current through the winding 72 flows in the core section 64. For purposes of a first-order analysis, details of which are provided below, FIG. 4 shows a flux $\phi$ generated by a current i flowing through the winding 70 in a direction into the page. A first portion $\phi_1$ of the flux $\phi$ flows through the core segment $74_c$, a second portion $\phi_2$ of the flux $\phi$ flows through the isolation section 68, a third portion $\phi_3$ of the flux $\phi$ flows through the isolation section, core segment $76_a$, back through the isolation section, and through core segment $74_b$, and a fourth portion $\phi_4$ of the flux $\phi$ flows through the isolation section, the core segments $76_d$, $76_c$, and $76_b$, back through the isolation section, and through the core segment $74_b$. As described below, the inductors 78 and 80 are magnetically uncoupled when $\phi_3+\phi_4=\phi_{coupling}=0$ or is otherwise negligible compared to $\phi$. A similar analysis applies to a flux generated by a current through the winding 72. As discussed below, the inductor structure 60 magnetically uncouples the inductors 78 and 80 by using the isolator 68 as a low-reluctance path for most of the flux $\phi$.

Figure 5:
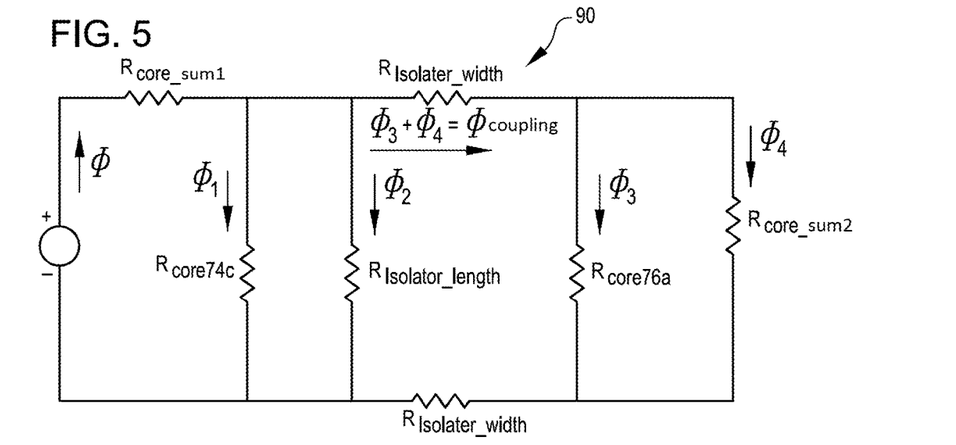
FIG. 5 is an embodiment of a magnetic-circuit model of the inductor structure of FIG. 4.

FIG. 5 is a schematic diagram of a magnetic-circuit model 90 of the inductor structure 60 of FIG. 4.

Referring to FIGS. 4-5, $\phi_{coupling}$ is given by the following equation:

$$\Phi_{coupling} = \Phi \frac{R_{core_{74c}} // R_{isolator\_length}}{R_{core_{74c}} // R_{isolator\_length} + 2R_{isolator\_width} + R_{core\_76a} // R_{core\_sum2}} \quad (8)$$

where $$R_{core\_sum1} = R_{core\_74a} + R_{core\_74b} + R_{core\_74d} \quad (9)$$

and $$R_{core\_sum2} = R_{core\_76b} + R_{core\_76c} + R_{core\_76d} \quad (10)$$

Because, as discusses above, $$\frac{\mu_{isolator}}{\mu_{core\_segment}} \geq 100,$$

$$R_{core\_74c} \approx R_{core\_76a} \approx R_{core\_76b} \approx R_{core\_76c} \approx R_{core\_76d} >> R_{isolator\_length} \quad (11)$$

and $$R_{core\_74c} \approx R_{core\_76a} \approx R_{core\_76b} \approx R_{core\_76c} \approx R_{core\_76d} >> 2R_{isolator\_width} \quad (12)$$

such that equation (8) reduces to:

$$\Phi_{coupling} \cong \Phi \frac{R_{isolator\_length}}{\frac{R_{core\_76a} R_{core\_sum2}}{R_{core_{76a}} + R_{core\_sum2}}} . \quad (13)$$

and $$\Phi_{coupling} \cong \Phi \frac{R_{isolator_{length}} (R_{core_{76a}} + R_{core\_sum2})}{R_{core\_76a} R_{core\_sum2}} \cong 0 \quad (14)$$

Per equation (14), as discussed above, the isolator section 68 acts as a low-reluctance shunt for the flux ϕ such that $\phi_{coupling} << \phi$; and, as discussed above, if $\phi_{coupling} << \phi$, then there is negligible magnetic coupling between the inductors 78 and 80. For example, assuming that length l and area A for $R_{isolator\_length}$ are approximately the same as l and A for the components of $R_{core\_76a}$-$R_{core\_76d}$ and assuming that $$\frac{\mu_{isolator}}{\mu_{core\_segment}} = 100,$$

$\phi_{coupling} \approx 1.33\%$ ϕ. Therefore, because $\phi_{coupling}$ is only about 1.33% of the total flux ϕ, for many applications there is negligible magnetic coupling between the inductors 78 and 80. Furthermore, the larger the ratio $$\frac{\mu_{isolator}}{\mu_{core\_segment}},$$

the smaller the ratio $$\frac{R_{isolator\_length}}{R_{core\_sum}},$$

the smaller $\phi_{coupling}$, and, therefore, the lower the level of magnetic coupling between the inductors 78 and 80.

Consequently, if $R_{isolator\_length} << R_{core\_74a} \rightarrow R_{core\_76d}$) then the inductor structure 60 includes two inductors 78 and 80, which, for many applications, may be considered to be magnetically uncoupled from one another.

Still referring to FIGS. 4-5, an embodiment of the inductor structure 60 may lack some of the problems that the inductor structure 10 of FIG. 1 may have.

For example, the manufacturing tolerances needed to manufacture the inductor structure 60 may be "looser" than the tolerances needed to manufacture the inductor structure 10. For example, because the core sections 64 and 66 are pressed against the isolator section 68 under high temperature and pressure while the core sections are still malleable, there is no need for precise machining of the core sections or the isolation section to prevent an unintended air gap between a core section and the isolation section. Furthermore, because the structure 60 includes no intended air gaps to provide high flux-isolation reluctances, there is no need for precise machining of air-gap dimensions.

Furthermore, the material from which the core sections 64 and 66 are made may have a relatively high electrical resistance to prevent electrical cross talk between the inductors 78 and 80.

And because the core sections 64 and 66 may have a relative high electrical resistance that prevents electrical cross talk, the windings 70 and 72 may be held "snugly" by the core sections to prevent audible noise caused by vibration of the windings.

In addition, because the magnetic-powder alloy is uniformly distributed within the core sections 64 and 66, the inductors 78 and 80 may have higher magnetic-saturation currents, and a more gradual post-magnetic-saturation fall off of inductance, than the inductors 34 and 36 of FIG. 1.

Still referring to FIGS. 4-5, another embodiment of the inductor structure 60 is described in which the isolator section 68 has a much lower permeability, and thus a much higher reluctance, than the core segments 74 and 76; for example, $$\frac{\mu_{core\_segment}}{\mu_{isolator}} \geq 100.$$

In such an embodiment, the isolator section 68 effectively blocks the flux from one of the inductors 78 and 80 from flowing to the other inductor as described below.

From equation (8) we have:

$$\Phi_{coupling} = \Phi \frac{R_{core\_74c} // R_{isolator\_length}}{R_{core_{74c}} // R_{isolator\_length} + 2R_{isolator\_width} + R_{core\_76a} // R_{core\_sum2}} \quad (15)$$

where $$R_{core\_sum2} = R_{core\_76b} + R_{core\_76c} + R_{core\_76d} \quad (16)$$

Because, as discussed above, $$\frac{\mu_{core\_segment}}{\mu_{isolator}} \geq 100,$$

$$R_{isolator\_length} >> R_{core\_74c} \approx R_{core\_76a} \approx R_{core\_76b} \approx R_{core\_76c} \approx R_{core\_76d} \quad (17)$$

and $$R_{isolator\_width} >> R_{core\_74c} \approx R_{core\_76a} \approx R_{core\_76b} \approx R_{core\_76c} \approx R_{core\_76d} \quad (18)$$

such that equation (15) reduces to:

$$\Phi_{coupling} \cong \Phi \frac{R_{core\_74c}}{2R_{isolator\_width}} \quad (19)$$

and to $$\Phi_{coupling} \cong \Phi \frac{R_{core\_74c}}{2R_{isolator\_width}} \cong 0 \quad (20)$$

Per equation (20), as discussed above, the isolator section 68 acts as a high-reluctance impeder of the flux $\phi$ such that $\phi_{coupling} << \phi$; and, as discussed above, if $\phi_{coupling} << \phi$, then there is negligible magnetic coupling between the inductors 78 and 80. For example, assuming that $w_1$ and A for $R_{isolator\_width}$ are approximately equal to 1/2 and A for the $R_{core\_74c}$ core segment, and assuming that $$\frac{\mu_{core\_segment}}{\mu_{isolator}} = 100,$$

$\phi_{coupling} \approx 1.0\% \ \phi$. Therefore, because $\phi_{coupling}$ is only about 1.0% of the total flux $\phi$, for many applications there is negligible magnetic coupling between the inductors 78 and 80. Furthermore, the larger the ratio, $$\frac{\mu_{core\_segment}}{\mu_{isolator}},$$

the smaller the ratio $$\frac{R_{core\_74c}}{2R_{isolator\_width}},$$

the smaller $\phi_{coupling}$, and, therefore, the lower the magnetic coupling between the inductors 78 and 80.

Consequently, if $2R_{isolator\_width} >> R_{core\_74c}$, then the inductor structure 60 includes two inductors 78 and 80, which, for many applications, may be considered to be magnetically uncoupled from one another.

Still referring to FIGS. 4-5, this embodiment the inductor structure 60 may lack some of the problems that the inductor structure 10 of FIG. 1 may have as described above for the first embodiment of the inductor structure 60. Furthermore, alternate embodiments of the inductor structure 60 are contemplated. For example, if the isolation section 68 is formed from a low-permeability material, such as copper or aluminum, that is also a good conductor of heat, then the isolation section may channel away (e.g., to a heat sink) heat generated by the inductors 78 and 80. Moreover, although shown as having a square cross section and a rectangular cross section, respectively, the inductors 78 and 80 and the isolation section 68 may each have any suitable shape.

Figure 6:
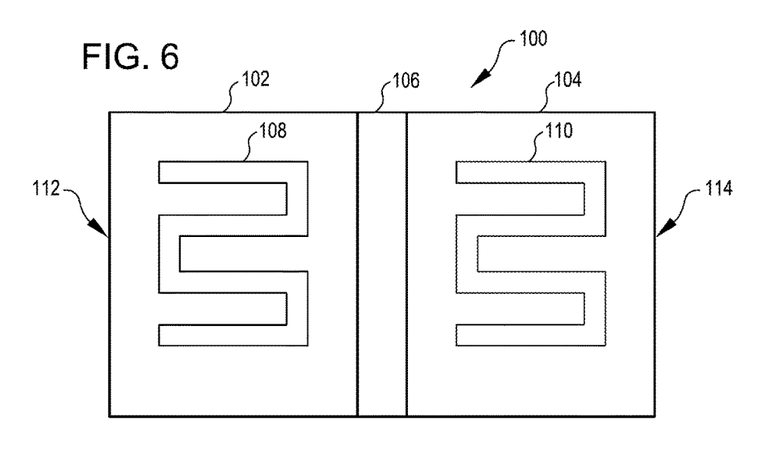
FIG. 6 is a cutaway side view of another embodiment of an inductor structure.

FIG. 6 is a cutaway side view of an inductor structure 100 according to an embodiment. The inductor structure 100 includes core sections 102 and 104, an isolation section 106, and windings 108 and 110, where the core sections and windings respectively form inductors 112 and 114. The inductor structure 100 may be similar to the inductor structure 60 of FIG. 4, except that the windings 108 and 110 have multiple turns, which may allow the inductors 112 and 114 to have higher inductances than the single-turn-winding inductors 78 and 80 of the structure 60. Furthermore, the isolation section 106, may, like the isolation section 68 of the structure 60, have a permeability that is significantly higher than, or significantly lower than, the permeabilities of the core sections 102 and 104 so as to maintain the magnetic coupling between the inductors 112 and 114 at a negligible level.

Figure 7:
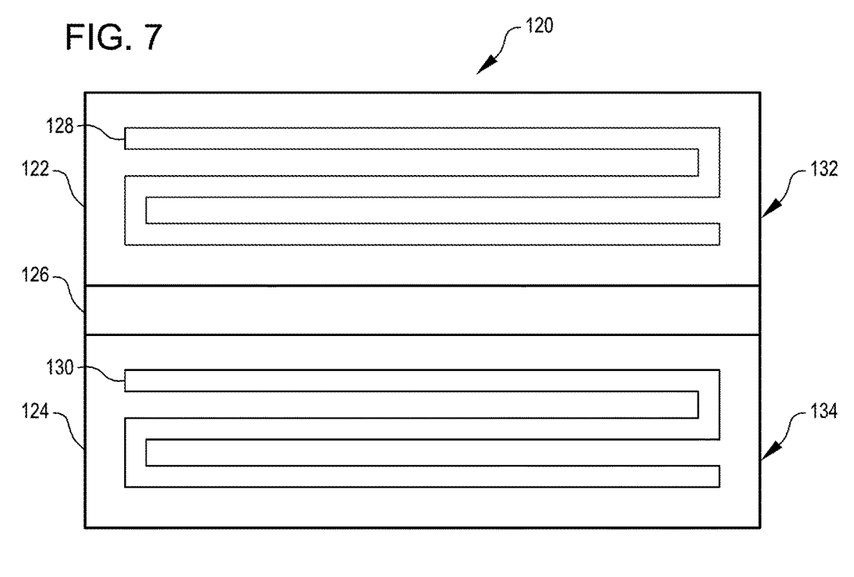
FIG. 7 is a cutaway side view of another embodiment of an inductor structure.

FIG. 7 is a cutaway side view of an inductor structure 120 according to an embodiment. The inductor structure 120 includes core sections 122 and 124, an isolation section 126, and windings 128 and 130, where the core sections and windings respectively form inductors 132 and 134. The inductor structure 120 may be similar to the inductor structure 100 of FIG. 6, except that the orientation of the windings 128 and 130 relative to the isolation section 126 is rotated by about 90° as compared to the orientation of the windings 108 and 110 relative to the isolation section 106 of FIG. 6. Furthermore, the isolation section 126, may, like the isolation section 68 of the structure 60 (FIG. 4) and the isolation section 106 of the structure 100 (FIG. 6), have a permeability that is significantly higher than, or significantly lower than, the permeabilities of the core sections 122 and 124 so as to maintain the magnetic coupling between the inductors 132 and 134 at a negligible level.

Figure 8:
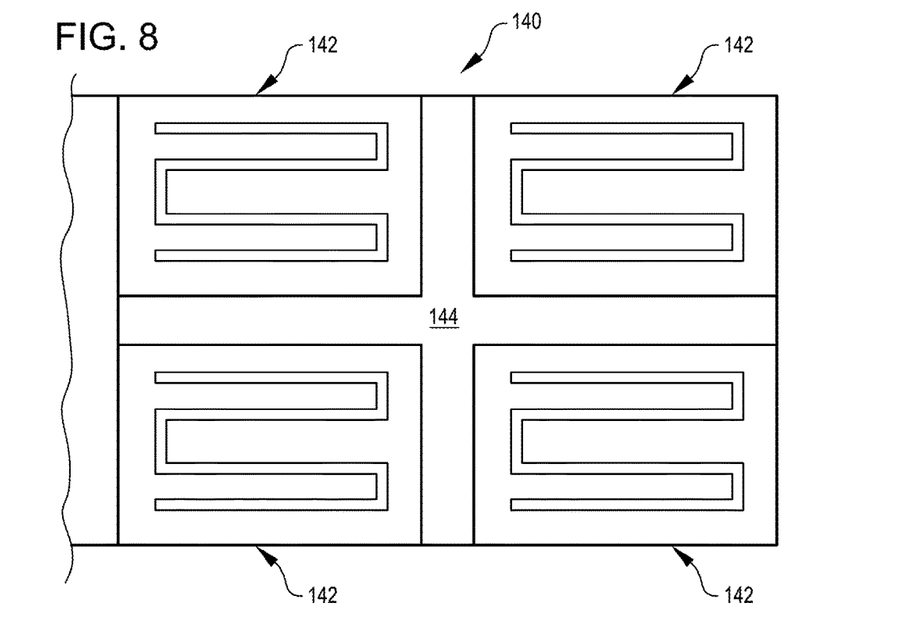
FIG. 8 is a cutaway side view of another embodiment of an inductor structure.

FIG. 8 is a cutaway side view of an inductor structure 140 according to an embodiment. The inductor structure 140 includes an array of more than two inductors 142, which are each similar to the inductors 112 and 114 of FIG. 6 in a horizontal direction, which are each similar to the inductors 122 and 124 of FIG. 7 in a vertical dimension, and which are separated by an isolation region 144. Like the isolation section 106 of FIG. 6, the isolation region 144 may have a permeability that is significantly higher than, or significantly lower than, the permeabilities of the core sections of the inductors 142 so as to maintain the magnetic coupling between respective pairs of the inductors 142 at negligible levels.

Figure 9:
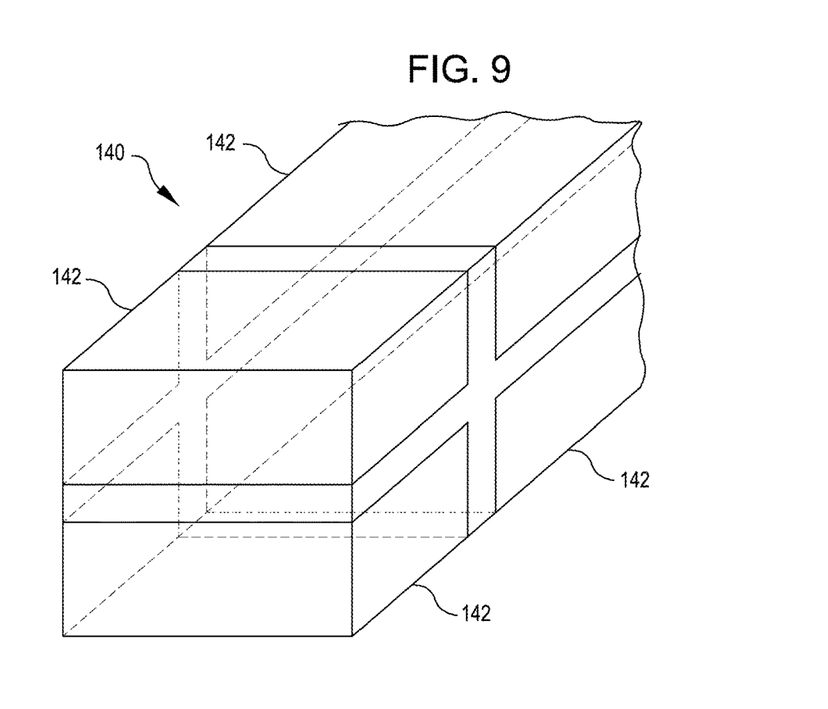
FIG. 9 is an isometric view of the inductor structure of FIG. 8.

FIG. 9 is a perspective view of the inductor structure 140 of FIG. 9 according to an embodiment; the windings of the inductors 142 are omitted from FIG. 9 for clarity.

Referring to FIGS. 8 and 9, alternate embodiments of the inductor structure 140 are contemplated. For example, one or more of the columns of the structure 140 may include more or fewer than two inductors 142. Furthermore, the structure 140 may be more than one inductor deep in at least some locations. Moreover, the structure 140 may include inductors such as the inductors 78 and 80 of FIG. 4 instead of, or in addition to, the inductors 142. In addition, the orientations of one or more of the inductors 142 relative to the isolation region 144 may be changed by rotating one or more of the inductors 142 relative to the isolation region 144.

Figure 10:
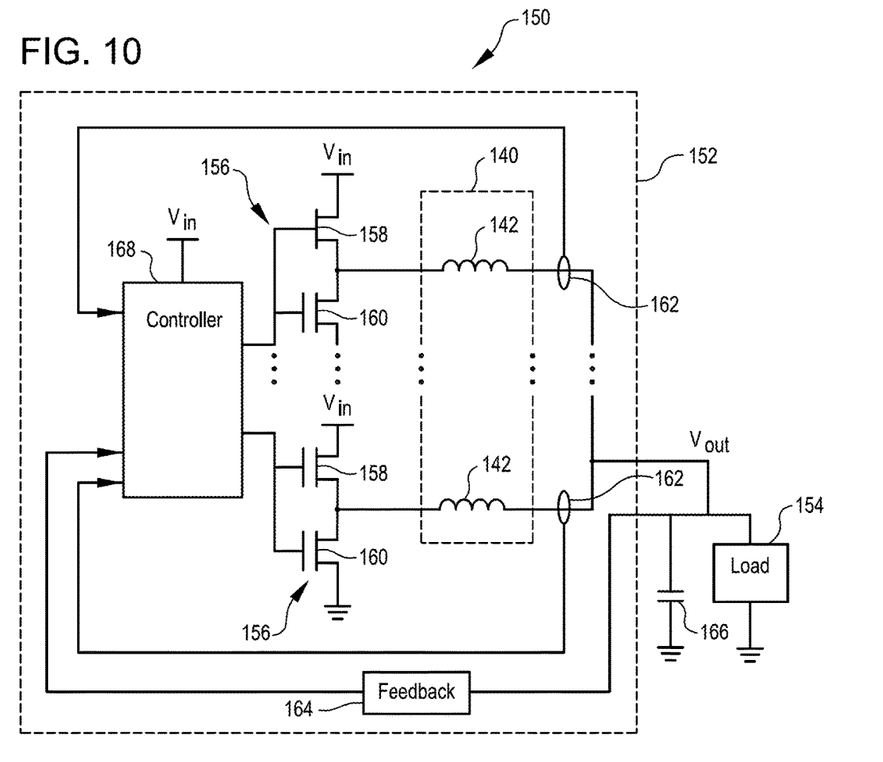
FIG. 10 is a diagram of a system that includes a power supply and a load, where the power supply includes one or more inductor structures of FIG. 4, 6, 7, 8, or 9 according to an embodiment.

FIG. 10 is a schematic diagram of an embodiment of a system 150 that may incorporate one or more embodiments of the inductor structures 60, 100, 120, and 140 of FIGS. 4, and 6-9. For purposes of explanation, however, the system 150 is discussed as incorporating an embodiment of the inductor structure 140 of FIGS. 8-9.

The system 150 includes a power supply 152, such as a buck converter, for providing a regulated output voltage $V_{out}$ to a load 154, such as an integrated circuit (IC), e.g., a controller such as a microprocessor or microcontroller. At least a portion of the power supply 152 and at least a portion of the load 154 may be disposed on a same, or on different, IC dies.

The power supply 152 includes multiple phases 156 that are intended to be magnetically uncoupled from one another. Each phase 156 includes a respective inductor 142 of the inductor structure 140, and includes a respective pair of high-side and low-side transistors 158 and 160.

The power supply 152 also includes phase-current sensors 162, a voltage feedback circuit 164, and a filter capacitor 166.

In addition, the power supply 152 includes a controller 168, which drives the transistors 158 and 160 in response to the feedback sensors 162 and the feedback circuit 164 so as to regulate $V_{out}$.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. An apparatus, comprising:
a first core region having a breadth along a dimension, a first permeability throughout the breadth, and no gap;
a first conductor disposed in the first core region;
a second core region having a second permeability;
a second conductor disposed in the second core region, there being disposed in the second core region no conductor that is disposed in the first core region; and
a non-gas isolation region disposed between the first and second core regions, having a third permeability that is significantly higher than the first and second permeabilities, having substantially the breadth along the dimension, and configured to impede magnetic coupling between the first conductor and the second conductor,
wherein at least one of the first and second core regions includes:
a respective binder material; and
a respective magnetic material that is approximately uniformly distributed in the binder material.

2. The apparatus of claim 1 wherein
the respective magnetic material comprises a powder alloy and the binder material comprises an epoxy.

3. The apparatus of claim 1 wherein at least one of the first and second core regions has a relatively low conductivity.

4. The apparatus of claim 1 wherein at least one of the first and second conductors includes a single-turn winding.

5. The apparatus of claim 1 wherein at least one of the first and second conductors includes a multiple-turn winding.

6. The apparatus of claim 1 wherein at least one of the first and second conductors is in contact with a respective one of the first and second core regions.

7. The apparatus of claim 1 wherein the isolation region is in contact with the first and second core regions.

8. The apparatus of claim 1 wherein the isolation region is in attached to the first and second core regions.

9. The apparatus of claim 1 wherein the isolation region is integral with at least one of the first and second core regions.

10. The apparatus of claim 1 wherein the isolation region has a relatively low conductivity.

11. The apparatus of claim 1 wherein the isolation region is configured to reduce a level of flux coupling between the first and second core regions.

12. An apparatus, comprising:
a first core region having a first permeability;
a first conductor disposed in the first core region;
a second core region having a second permeability;
a second conductor disposed in the second core region, there being disposed in the second core region no conductor that is disposed in the first core region;
a non-gas isolation region disposed between the first and second core regions and between the first and second conductors, having a third permeability that is significantly different than the first and second permeabilities, and configured to impede magnetic coupling between the first conductor and the second conductor at a level of impedance that would increase if the third permeability were to increase; and
wherein the third permeability is significantly greater than each of the first and second permeabilities.

13. An apparatus, comprising:
a first ungapped core region having a first permeability;
a first conductor disposed in the first core region;
a second core region having a second permeability;
a second conductor disposed in the second core region, there being disposed in the second core region no conductor that is disposed in the first core region;
a non-gas isolation region disposed between the first and second core regions and between the first and second conductors, having a third permeability that is significantly greater than the first and second permeabilities, and
configured to impede magnetic coupling between the first conductor and the second conductor; and
wherein the isolation region has a relatively high electrical conductivity.

14. A power supply, comprising:
a driver;
an output node;
a control circuit configured to cause the driver to generate a regulated output signal on the output node; and
an inductor structure including a first, ungapped, core having a first permeability;
a first inductor disposed in the first core and coupled between the driver and the output node;
a second core having a breadth in a dimension, having a second permeability throughout the breadth, and lacking a conductor that is disposed in the first core;
a second inductor disposed in the second core and coupled between the driver and the output node; and
a solid isolator disposed between the first and second cores, having a third permeability that is significantly greater than the first and second permeabilities, having substantially the breadth in the dimension, and configured to inhibit, substantially, magnetic coupling between the first and second inductors.

15. A system, comprising:
a power supply including a driver;
an output node;
a control circuit configured to cause the driver to generate a regulated output signal on the output node; and
an inductor structure including a first core having a thickness in a dimension, a first permeability throughout the thickness, and no gap;
a first inductor disposed in the first core and coupled between the driver and the output node;
a second core having a second permeability and lacking a conductor that is disposed in the first core;
a second inductor disposed in the second core and coupled between the driver and the output node; and
a solid isolator disposed between the first and second cores, having a third permeability that is significantly greater than the first and second permeabilities, having substantially the thickness in the dimension, and configured to impede magnetic coupling between the first and second inductors; and an integrated circuit coupled to the output node of the power supply.

16. The system of claim 15 wherein the integrated circuit includes a controller.

17. The system of claim 15 wherein at least a portion of the power supply and at least a portion of the integrated circuit are disposed on a same integrated-circuit die.

18. The system of claim 15 wherein at least a portion of the power supply and at least a portion of the integrated circuit are disposed on respective integrated-circuit dies.

19. A method, comprising:
  causing a magnetic flux to flow through a first, ungapped, core region having a breadth along a dimension and having a substantially uniform composition throughout the breadth; and
  impeding the flow of the flux through a second core region in which there is disposed no winding that is disposed in the first core region, and impeding a magnetic coupling between a winding that is disposed in the first core region and a winding that is disposed in the second core region, with a non-gaseous isolation region that is disposed between the first and second core regions, that has substantially the breadth along the dimension, and that has a permeability significantly higher than a permeability of the first core region and a permeability of the second core region.

20. The method of claim 19, further comprising impeding, with the first core region, the flow of a current from the winding that is disposed in the first core region to the winding that is disposed in the second core region.

21. A method, comprising:
  causing a magnetic flux to flow through a first core region;
  impeding the flow of the flux through a second core region in which there is disposed no winding that is disposed in the first core region, and impeding a magnetic coupling between a winding that is disposed in the first core region and a winding that is disposed in the second core region, with a non-gaseous isolation region that is disposed between the first and second core regions and wherein impeding the flow of the flux includes presenting a path to the flux through the isolation region, the path having a reluctance that is lower than reluctances of the first and second core regions, and
  wherein a level of the impeding of the flow of the flux would increase if the reluctance of the path where to decrease.

* * * * *